United States Patent [19]

Reed

[11] 3,917,961

[45] Nov. 4, 1975

[54] CURRENT SWITCH EMITTER FOLLOWER MASTER-SLAVE FLIP-FLOP

[75] Inventor: L. J. Reed, Mesa, Ariz.

[73] Assignee: Motorola, Inc., Chicago, Ill.

[22] Filed: June 3, 1974

[21] Appl. No.: 475,695

[52] U.S. Cl. ................ 307/243; 307/218; 307/269; 307/291; 328/206

[51] Int. Cl.$^2$ .................... H03K 3/286; H03K 17/60

[58] Field of Search ........... 307/243, 289, 291, 269; 328/206

[56] References Cited

UNITED STATES PATENTS

| | | | |
|---|---|---|---|
| 3,591,856 | 7/1971 | Kalb | 307/269 X |
| 3,609,569 | 9/1971 | Todd | 307/291 X |
| 3,617,776 | 11/1971 | Priel | 328/206 X |

*Primary Examiner*—Siegfried H. Grimm
*Attorney, Agent, or Firm*—Harry M. Weiss; Kenneth R. Stevens

[57] ABSTRACT

The operating speed of a sequential OR/NOR current switch emitter follower master-slave flip-flop is improved by adding an additional master section or block in order to eliminate input sequential gating circuitry and still accommodate and provide a NAND-/AND logic function.

8 Claims, 2 Drawing Figures

CURRENT SWITCH EMITTER FOLLOWER MASTER-SLAVE FLIP-FLOP

BACKGROUND OF THE INVENTION

1. FIELD OF THE INVENTION

This invention relates to a flip-flop circuit and, more particularly, to a master-slave flip-flop circuit.

2. DESCRIPTION OF PRIOR ART

In certain current switch emitter follower logic families, the OR/NOR logic block constitutes a basic logic gate. As is well known, the OR/NOR gate may be readily expanded to accommodate as many input variables as desired by the simple addition of input switching transistors. Very little loss in performance is suffered by the use of this technique. However, the NAND/AND function is much more difficult to implement and usually requires either collector "dotting" of two OR/NOR gates or series gating arrangements. Both of these techniques sacrifice performance. Obviously, in the implementation of sequential circuits the necessity or requirement for an AND/NAND function as an input to a basic flip-flop gate limits AC performance of the circuit. For a sequential circuit, the maximum operating frequency is limited to the maximum frequency of the slower logic block. In order to maximize the operating frequency, it is necessary to minimize or eliminate the propogations delay associated with the sequential gates.

FIG. 1 illustrates the prior art approach and the propagation delay introduced by input gates wherein the overall operating frequency of speed of the circuit is limited by a pair of input OR gates 10 and 12 connected to and AND gate 14. The AND gate 14 is in turn connected to an overall master-slave logic block schematically represented at 16. As is well known in the art, this prior art arrangement is designed for clock-storage operation based upon a master-slave principle. Operation depends only on voltage levels, and the shape of the clock waveform becomes unimportant in determining the state of the flip-flop 16. The circuit receives input data signals D1 . . . D4 in conjunction with a clock signal C. In this prior art representation, the logic block 16 contains both the master and slave section, not shown for purposes of clarity. When the clock signal is low, the input data is stored in the master section and is subsequently transferred to the slave section when the clock signal is high thus making the data available at the output terminals represented as Q and $\overline{Q}$. Again the overall speed of this circuit is limited by the sequential gating circuits 10, 12 and 14. Although it is possible to readily incorporate the OR logic functions attributable to gates 10 and 12 into the basic OR/NOR logic family, the existence of AND gate 14 and its associated propogation delays limits performance.

SUMMARY OF THE INVENTION

An object of the present invention is to provide a master-slave flip-flop circuit with AND/NAND and OR/NOR logic capabilities operating at maximized operating frequencies.

Another object of the present invention is to provide a master-slave flip-flop with full logic capability which is capable of operating at faster speeds without additional power requiremennts.

Another object of the invention is to provide a master-slave flip-flop arrangement which is readily implementable into a counter capable of providing multi-count sequences without sacrificing performance in the basic count sequence.

In accordance with the aforementioned objects, the present invention provides a master-slave flip-flop arrangement which employs two or more input master logic blocks combined with a slave logic block wherein the master logic block sections are wired-orred at a common node to provide the data to the slave logic block.

BRIEF DESCRIPTION OF THE DRAWINGS

FIG. 1 is an electrical block diagram illustrating one prior art approach.

FIG. 2 is an electrical block diagram illustrating the present invention, while FIG. 3 is a detailed schematic of the block diagram circuit shown in FIG. 2.

DETAILED DESCRIPTION OF THE PREFERRED EMBODIMENT

Figures 1, 2, 3:
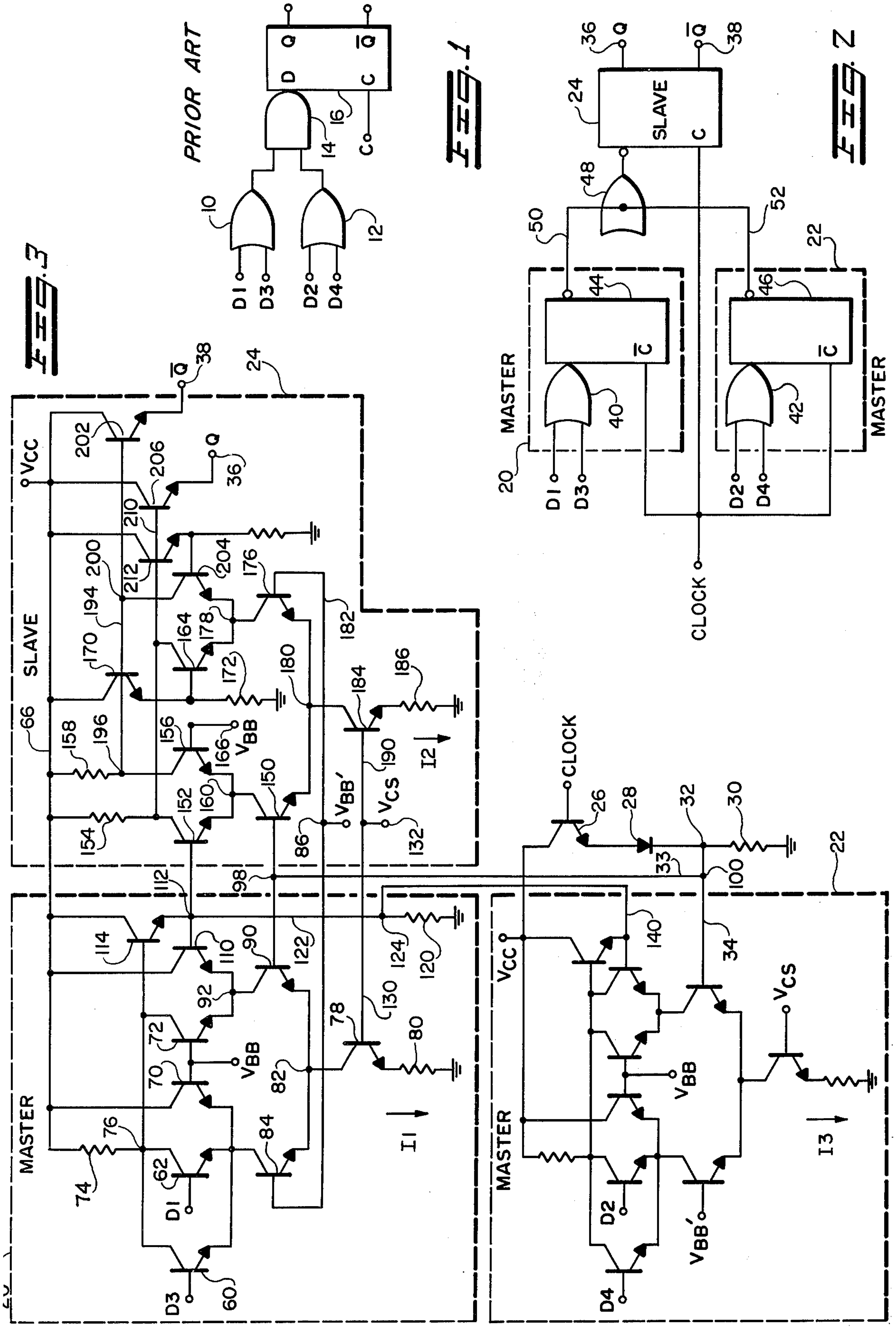

Now referring to FIGS. 2 and 3, they illustrate the basic invention which comprises at least two master input logic blocks 20 and 22 connected to a slave logic block 24. The master blocks 20 and 22 are adapted to receive data input signals D1, D3 and D2, D4, respectively, although the number or capacity of individual master blocks can be expanded to handle additional data input signals within the spirit of the present invention.

The logic blocks 20, 22 and 24 are adapted to receive high and low levels of clock signal C applied via transistor 26 which is in turn connected at its emitter terminal to diode 28, resistor 30, and then to ground potential. The clock signal is generated at node 32 and applied to master block 20 and slave block 24 by means of line 33 and to master block 22 via line 34. The slave block 24 is adapted to generate both an in-phase and out-of-phase output signals Q and $\overline{Q}$ at output terminals 36 and 38, respectively. However, it is to be realized that for certain applications the slave block 24 can be somewhat simplified if the $\overline{Q}$ signal is not required.

In the block diagram of FIG. 2, the OR function is represented by OR gates 40 and 42 which are in turn connected to flip-flop elements 44 and 46, respectively. The output signals from the flip-flop or storage elements 44 and 46 are wire-orred together at 48 and then applied to the slave section 24. Functionally, the logic blocks 20 and 22 are effective to provide the NAND/AND signal representation, $\overline{D1}+\overline{D3}$ and $\overline{D2}+\overline{D4}$, on lines 50 and 52, respectively, upon the generation of a low clock signal $\overline{C}$. After these signals are wire-orred at 48, they are applied to slave section 24 upon the application of a high clock signal C in order to generate either a Q or a Q output signal on lines 36 and 38, respectively.

Now referring to FIG. 3 and the circuit details of the present invention, the master logic block 20 includes a plurality of input switching transistors 60 and 62 adapted to receive a data signal D1 and D3. A common supply voltage $V_{CC}$ is connected at line 66 and a supply voltage $V_{BB}$ is connected to the base terminals of a pair of reference transistors 70 and 72. A biasing resistor 74 is connected between line 66 and a node 76. A current source constituted by transistor 78 and resistor 80 is connected between ground potential and node 82. A transistor 84 connected between the emitter terminal of transistor 60 and node 82 is biased by a second reference potential $V_{BB}$, connected at node 86 in order to provide a current path between the emitter of transistor 60 and node 82. A switching transistor 90 is connected between node 82 and a node 92 and its base terminal is connected to the clock signal by means of line 33 connected between nodes 98 and 100. A transistor 110 is connected between node 92 and line 66 and its base terminal is connected to a wire-orred output node 112. Also connected to the output node 112 is emitter follower output transistor 114 having its base terminal connected to node 76, its collector terminal connected to line 66, and its emitter terminal connected to node 112. A biasing resistor 120 is also connected to node 112 by means of line 122 connecting the upper terminal of resistor 120 to node 124. Finally, the base terminal of transistor 78 is also connected to a fixed reference supply $V_{CS}$ as by means of line 130 connected to terminal 132.

It is seen that master logic blocks 20 and 22, respectively, are structurally and functionally identical, and therefore from an operational standpoint, a description of master block 20 is sufficient to allow one of ordinary skill in the art to use and make the invention, and accordingly for purposes of clarity, the details of block 22 will not be specifically enumerated. The generated output signals from blocks 20 and 22 are wire-orred at node 112. Emitter follower output transistor 114 provides the output signal to node 112 from block 20, and the corresponding emitter follower output transistor from block 22 provides its corresponding output signal to node 112 by means of line 140 connected to node 124.

Now referring to these specific details of slave logic block 24, it is seen that again the basic logic block is structurally very similar to the input logic blocks 20 and 22. The generated output signal at node 112 is applied and stored in the output slave section 24 upon the generation of a high clock signal C applied to the base terminal of switching transistor 150 via node 98. An input switching transistor 152 receives the output signal from node 112 at its base terminal and is in turn connected to the fixed applied $V_{CC}$ by means of resistor 154 and line 66. A reference transistor 156 is also connected at its collector terminal to line 66 by means of resistor 158, and the emitter terminal of transistor 152 and 156 are commonly connected at node 160 to the collector of transistor 150. Fixed reference supply $V_{BB}$ connects to the base terminal of transistor 156 by means of terminal 166.

Connected between ground potential and line 66 is a translating resistor transistor 170 and resistor 172. A transistor 176 is connected between nodes 178 and 180, and its base terminal is connected to the fixed supply voltage $V_{BB}$, by means of line 182. A current source constituted by transistor 184 and resistor 186 connected between node 180 and ground potential. The base of transistor 184 is connected to fixed supply $V_{CS}$ via line 190. A common base line 194 connects node 196 to the base of transistor 170, node 200, and to the base terminal of emitter follower output transistor 202. A transistor 204 is connected between node 200 and node 178. A second emitter follower output transistor 206 is connected between the output terminal 36 and line 66, and its base terminal is connected by means of common base line 210 to the base of a translating transistor 212, to the collector of transistor 164, and to the terminal collector of transistor 152.

OPERATION

Now referring to these detailed circuitry illustrated in the schematic of FIG. 3, the fixed reference supplies $V_{BB}$, $V_{BB'}$, $V_{CS}$ are DC voltages, which are selected and generated either by separate supplies or by internal bias drivers (not shown) such that their magnitudes are the center values of the voltage swings with respect to the voltages associated with the translated clock inputs. Transistor 26, diode 28, and resistor 30 translates the input clock level signals in order that they are compatible to an input voltage swing centered around $V_{BB'}$. The current sources previously designated generate currents I1, I2, and I3 as depicted.

In order to illustrate the operation of the invention, the operation of a single master logic block is first described. This can be done by assuming that the two master sections are disconnected by breaking the connection to line 140, which disconnects the master section 22 from the node 112. Four possible logic conditions exist for the master logic block 20, for a data signal D1:

| D1 | C |
|---|---|
| 0 | 0 |
| 1 | 0 |
| 0 | 1 |
| 1 | 1 |

Assuming that D1=1 and C=0, then transistor 84 is conductive and transistor 90 is nonconductive or off. It is also noted that with transistor 90 off, transistors 72 and 110 are also off or nonconductive. Thus the current I1 flowing through transistor 84 must flow through either the transistor 62 or 70. With the data signal D1 equal to one, transistor 70 is off and thus current I1 flows through transistor 62 from resistor 74 connected to line 66. Accordingly, a voltage drop is created across resistor 74 which in turn is level shifted by the emitter follower transistor 114 and applied to the base of transistor 110 at node 112. Thus, with the D1 data signal high, it is inverted and transmitted to the base of transistor 110 which in turn constitutes an input signal to slave logic block 24.

Conversely, if the D1 input signal is changed to a down or zero level when the clock signal C is zero or at a $\overline{C}$ state, then transistor 62 is off or nonconductive and thus current I1 would flow through transistor 70. With transistor 62 in an off condition, no voltage drop exists across resistor 74 and thus the emitter follower transistor 114 generates a high or binary one level at its emitter terminal which in turn is connected to node 112. Accordingly, the low or down D1 input data signal has been inverted and transmitted to the base of transistor 110. Summarizing, when with clock signal C at a down or zero level, the input master section inverts the input data and transmits it to the base of transistor 110 which in turn is the input data for the output slave logic block 24.

Now considering the operation of the input section 20 when the clock signal makes a positive transition from a binary zero or down level to binary one or up level for each of the above conditions. With input data signal D1 at an up or binary one level the base of transistor 90 goes from a binary zero level to a binary one level with the positive transition of the clock signal and thus it is rendered conductive, thus current I1 flowing through transistor 84 flows or is diverted to transistor 90. This current must then flow through either transistor 72 or 110. As the base of transistor 110 is low the current flows through transistor 72 by ways of resistor 74. Thus, although the current is being switched to transistor 72, the current flow through resistor 74 remains substantially constant, thus the down level transmitted to the base of terminal 110 remains at a down level and the signal condition at the input to the section 24 is maintained. Once the clock transition is complete all the current is then flowing through transistor 72 and the down or zero level at the output of block 20 is stored in a latching mode formed by transistors 72, 110, 114, and resistor 74. Since both transistors 62 and 70 are off no information can be accepted by master logic block 20.

Now considering the case where the D1 data signal is at a down or binary zero level prior to the positive clock transition, it is seen that the base terminal of transistor 110 is high and the current I1 will flow through transistor 110. After the clock transition is complete all the current continues to flow through transistor 110 and the latch maintains the binary one or up level at the master output node 112 which in turn provides the input to the slave section 24. Summarizing, it can be seen that for all possible conditions the master section 20 accepts and inverts any information applied at its data input terminals when the clock signal C=0. When the C signal makes the positive transition to a binary one or up level, the information in the master section 20 is stored and no information will be accepted. This information is stored as long as the clock signal C remains at a binary one level. Similar operation results for the D3 input and thus an explanation is not required. The master logic block 22 operates in an identical manner and thus no further explanation is required.

Next, it is assumed that the master sections 20 and 22 are connected together as specifically shown in FIG. 3. In the preferred embodiment this connection is accomplished by wire-orring the emitter terminals of transistor 114 and the corresponding output emitter follower transistor in master section 22 by means of line 140.

As previously explained, node 112 will reside at a binary one or up level when either transistors 114 or its corresponding transistor in logic block 22 is in a binary one level. The logical representation for node 112 can thus be described as: $\overline{D1+D3} + \overline{D2+D4}\ \overline{D1}\ \overline{D3} + \overline{D2}\ \overline{D4}$. This effectively provides a NAND/OR logic function at note 112 in response to the application of input data signals D1 . . . D4.

Now observing the operation of the slave-section 24, assuming that the input signal to transistor 152 is in a binary one or up level, and the Q output signal on line 36 is also at a binary one signal, and that the clock signal C is down or a binary zero level, than transistor 176 is on and transistor 150 is off. With transistor 150 off, transistors 152 and 156 are also off. Accordingly, current I2 flowing in the slave section 24 flows through transistor 176. Similarly, current flowing through transistor 176 must flow through either transistor 164 or transistor 204. For the assumed conditions, that is, Q=1, the base terminal of transistor 204 is at a higher voltage level than the base terminal of transistor 164. Therefore, transistor 204 is conductive and current I2 flows entirely through transistor 204 and a voltage drop is created across resistor 158, which in turn is translated or level shifted by transistor 170 to the base of transistor 164. As the base of transistor 164 is at a lower potential than the base 204 the assumption that transistor 164 is off and transistor 204 is conductive for the given considerations is valid. Thus in this state, transistors 164, 204, 212, 170, and the resistor 158 form a latch which is stable for either condition Q=1, Q=0. Also, it is noticed that since transistors 152 and 156 are off or nonconductive, any input signals to the base of transistor 152 are ineffectual when the clock signal C is low.

Next, considering the case when the clock signal C makes a positive transition to a high state and that the input signal to the base terminal of transistor 152 is at a zero or down level, the voltage at the base of transistor 150 goes positive, and transistor 150 turns on and current I2 flows through transistor 156 from its collector resistor 158. The voltage drop across resistor 158 is level shifted or translated by transistor 170 and applied to the base of transistor 164. As transistor 152 is off no current flows through its collector resistor 154 and the output of transistor 206 is high. Thus for a positive clock transition, the binary down level at the input node 112 has been inverted and transferred to the Q output 36 as a binary up level. Likewise, for a binary up level at the input node 112, a binary down level is generated at the Q output 36. The $\overline{Q}$ output node 38 provides the complement binary level of that generated at terminal 36.

Accordingly, both the master logic blocks 20 and 22 invert received information or data prior to transferring it to the slave logic block. It has been previously shown that the node 112 provides the NAND/OR logical function and that the slave section 24 provides an invert function. Thus, the input signal to slave section 24 is constituted by the output signals generated from the master sections 20 and 22 and the output signal from the slave section 24 at terminal 36 can be designated as $Q=\overline{D1}\ \overline{D3}+\overline{D2}\ \overline{D4}=(D1+D3)\ (D2+D4)$. This analysis clearly illustrates the the OR/AND function previously performed by separate input gates to the flip-flop circuitry is now incorporated into the flip-flop circuitry without causing any additional propagation delay.

This type of flip-flop thus can be readily implemented for counters that are capable of operating at the toggle frequency of the basic flip-flops.

What is claimed is:

1. A master slave flip-flop circuit comprising:

a. first and second OR/NOR current switch emitter follower master logic blocks, each being responsive to a clock signal first signal level for storing data signals and providing a logic output signal at a common terminal means, b. a current switch emitter follower slave inverter logic block connected to the common terminal means and being responsive to a block signal second signal level for receiving and storing the logic output signal for providing an inverted output signal of the logic output signal at an output terminal means.

2. A master slave flip-flop circuit as in claim 1 wherein:

a. said first and second master logic blocks each comprise first and second emitter follower output transistors, respectively, and having their emitter terminals directly interconnected for constituting said common terminal means.

3. A master slave flip-flop circuit as in claim 2 wherein:

a. said slave logic block further includes a third emitter follower output transistor and said output terminal means is constituted by its emitter terminal.

4. A master slave flip-flop circuit as in claim 3 wherein:

a. said slave logic block further includes a fourth emitter follower output transistor for providing the complement of said inverted output signal at its emitter terminal.

5. A master slave flip-flop circuit as in claim 4 wherein:

a. said first and second master logic blocks each include first and second input switching transistors for receiving data signals at their respective base terminals.

6. A master slave flip-flop circuit as in claim 5 wherein:

a. said slave logic block comprises a third input switching transistor for receiving said logic output signal at its base terminal.

7. A master slave flip-flop circuit as in claim 6 further including:

a. current source means connected to said first, second, and third input switching transistors.

8. A master slave flip-flop circuit as in claim 7 further including:

a. clock signal means connected to said first and second master logic blocks and to said slave logic block for transferring the information to said common terminal means at a clock signal first level and to said output terminal means at a clock signal second level.

* * * * *